US009451087B2

(12) United States Patent
Fagundes et al.

(10) Patent No.: US 9,451,087 B2
(45) Date of Patent: Sep. 20, 2016

(54) AGENT MATCHING BASED ON VIDEO ANALYSIS OF CUSTOMER PRESENTATION

(75) Inventors: Luciano Godoy Fagundes, Sao Paulo (BR); Thomas Moran, Kingston (IE); Dhaval Desai, Rajkot (IN); Joylee Kohler, Northglenn, CO (US); Paul Roller Michaelis, Louisville, CO (US)

(73) Assignee: Avaya Inc., Basking Ridge, NJ (US)

( * ) Notice: Subject to any disclaimer, the term of this patent is extended or adjusted under 35 U.S.C. 154(b) by 434 days.

(21) Appl. No.: 13/447,943

(22) Filed: Apr. 16, 2012

(65) Prior Publication Data

US 2013/0272565 A1 Oct. 17, 2013

(51) Int. Cl.
*G06K 9/00* (2006.01)
*H04M 3/523* (2006.01)
*H04M 3/51* (2006.01)

(52) U.S. Cl.
CPC .......... *H04M 3/523* (2013.01); *H04M 3/5116* (2013.01); *H04M 2201/18* (2013.01); *H04M 2201/50* (2013.01)

(58) Field of Classification Search
CPC ................... H04M 2201/18; H04M 2201/50; H04M 3/5116; H04M 3/523; H04M 3/51; G06K 9/00; G06K 9/00221; H04N 7/147
USPC ........................................................ 382/100
See application file for complete search history.

(56) References Cited

U.S. PATENT DOCUMENTS

| 6,526,395 | B1* | 2/2003 | Morris ............................ 706/20 |
| 7,848,548 | B1 | 12/2010 | Moon et al. |
| 7,912,246 | B1 | 3/2011 | Moon et al. |
| 8,054,964 | B2 | 11/2011 | Flockhart et al. |
| 8,130,935 | B1 | 3/2012 | Coughlan et al. |
| 2004/0001616 | A1* | 1/2004 | Gutta et al. .................... 382/118 |
| 2005/0275506 | A1 | 12/2005 | Otsuka |
| 2007/0282912 | A1* | 12/2007 | Reiner ....................... 707/104.1 |
| 2008/0151038 | A1* | 6/2008 | Khouri et al. ............. 348/14.01 |
| 2008/0260212 | A1* | 10/2008 | Moskal ................ A61B 5/1079 382/118 |
| 2010/0235218 | A1 | 9/2010 | Erhart et al. |
| 2010/0296417 | A1 | 11/2010 | Steiner |
| 2011/0125793 | A1 | 5/2011 | Erhart et al. |
| 2011/0125826 | A1 | 5/2011 | Erhart et al. |
| 2011/0255683 | A1 | 10/2011 | Flockhart et al. |
| 2011/0310237 | A1* | 12/2011 | Wang et al. .................... 348/77 |

OTHER PUBLICATIONS

Official Action for United Kingdom Patent Application No. GB1217233.4, dated Jan. 25, 2013 7 pages.
Gagvani, "Introduction to video analytics"; www.eetimes.com/General/PrintView/4013494; dated Aug. 22, 2008; 11 pages.
Official Action for United Kingdom Patent Application No. GB1217233.4, dated Aug. 18, 2014 3 pages.

* cited by examiner

*Primary Examiner* — Tom Y Lu
(74) *Attorney, Agent, or Firm* — Sheridan Ross P.C.

(57) ABSTRACT

Systems and methods for routing and/or servicing contacts using video analysis of one or more video streams are provided. The systems and methods are particularly applicable to a contact center.

20 Claims, 4 Drawing Sheets

AGENT MATCHING BASED ON VIDEO ANALYSIS OF CUSTOMER PRESENTATION

FIELD

The present invention is directed to the application of video analytics to multimedia contacts in contact centers.

BACKGROUND

Contact centers are systems that enable agents to serve incoming and/or outgoing calls, with the calls being distributed and connected to whichever of the agents is available to handle the call. When no agents are free and available to handle an incoming call, additional incoming calls are typically placed in a holding queue to await an available agent.

Unfortunately, a typical contact center makes no use of, the potentially rich, video information available in the contact for analysis, either in the incoming call or while the call is on hold. Examples of such information include the contactor presentation (e.g., the contactor attire and associated style, contactor mannerisms, physical condition, and mood), and background information to the contactor. Such information can prove useful in selecting a skilled resource to service the contact and/or providing information to the selected resource to service better the contactor.

SUMMARY

The present disclosure is directed to solving these and other problems and disadvantages of the prior art. Generally, according to embodiments of the present disclosure, a processor-executable video analysis module analyzes a video stream to produce video analysis results, and a processor executable work assignment engine selects, based on the video analysis results, a resource to service a contact associated with the video stream.

A contact center can use the potentially rich video information (e.g., contactor presentation (e.g., the contactor attire and associated style, contactor mannerisms, physical condition, and mood), and background information to the contactor available in the contact for analysis, either in the incoming call or while the call is on hold. Such information can prove useful in selecting a skilled resource to service the contact and/or providing information to the selected resource to service better the contactor. Matching appropriate agents to customers can help make the customer feel closer to the agent and his employer, help improve customer relations, satisfaction, and retention, and increase contact center revenues.

In one configuration, a source of the video stream is the selected resource, and the video stream comprises an image of the selected resource. In this configuration, the video analysis results are compared against video analysis results from analysis of a second video stream from a contactor associated with the contact to select the resource. In this way, a better appearance match can be made between the agent and contactor.

In one configuration, a source of the video stream is a contactor associated with the contact. The video stream comprises an image of the contactor, and the video analysis results comprise an identification instance of one or more of the following: a body part of the contactor, a bodily movement of the contactor, a bodily position of the contactor, a bodily orientation of the contactor, an item or article of clothing of the contactor, a gesture of the contactor, a mood of the contactor, a mannerism of the contactor, a facial expression of the contactor, a medical condition of the contactor, and a human or non-human object in a scene provided by the video stream. The video analysis results comprise a prediction of one or more of the following: an identity of the contactor, a socioeconomic class of the contactor, a customer class of the contactor, a geographical location of the contactor, an age of the contactor, a profession of the contactor, a need of the contactor, a manufacture, brand or model of an item associated with the contactor, and a purpose of the contact.

In one configuration, the selected resource is an emergency responder and the steps are performed by a Public Safety Access Point contact center. The video analysis results are used for one or more of: to provide advice to the emergency responder, to select a type of emergency responder to be dispatched, to determine a geographic location of the contractor, to determine an urgency in dispatching an emergency responder, and to identify contacts associated with a common emergency event.

These and other advantages will be apparent from the disclosure.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "automatic" and variations thereof refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

A "call center" is a physical place where customer and other telephone calls are handled by or on behalf of an organization. Typically, a call center concurrently handles a considerable volume of calls, which treatment includes screening and forward calls to human or automated resources or agents for servicing.

A "computer-readable medium" refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

A "contact" refers to an interaction between selected parties/entities over one or more channels. The parties/entities can be human, such as a customer, agent, and supervisor, or nonhuman, such as an Interactive Voice Response unit, a Web server, content analyzer, email server, and the like.

A "contact center" (or a customer interaction center or e-contact center) is a facility within an enterprise from which customer contacts are directed to or managed or serviced by contact center resources. The contact center typically includes one or more online call centers but may include other types of customer contacts, including e-mail newsletters, postal mail catalogs, Web site inquiries and chats, instant messages, and the collection of information from customers during in-store purchasing. A contact center is generally part of an enterprise's overall customer relationship management ("CRM").

The terms "determine", "calculate" and "compute," and variations thereof are used interchangeably and include any type of methodology, process, mathematical operation or technique.

The term "means" shall be given its broadest possible interpretation in accordance with 35 U.S.C., Section 112, paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

The term "module" refers to any known or later developed hardware, software, firmware, artificial intelligence, fuzzy logic, or combination of hardware and software that is capable of performing the functionality associated with that element. Also, while the disclosure is presented in terms of exemplary embodiments, it should be appreciated that individual aspects of the disclosure can be separately claimed.

A "predictive dialer" dials a list of telephone numbers and connects answered dials to people making calls, often referred to as agents. Predictive dialers use statistical algorithms to minimize the time that agents spend waiting between conversations, while minimizing the occurrence of someone answering when no agent is available.

"Video analytics" refers to the extraction of meaningful and relevant information from digital video. As opposed to video compression, which attempts to exploit the redundancy in digital video for the purpose of reducing size, analytics is concerned with understanding the content of video.

The preceding is a simplified summary of the disclosure to provide an understanding of some aspects of the disclosure. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible utilizing, alone or in combination, one or more of the features set forth above or described in detail below.

DETAILED DESCRIPTION

The invention will be illustrated below in conjunction with an exemplary communication system. Although well suited for use with, e.g., a system having an ACD or other similar contact processing switch, the invention is not limited to use with any particular type of communication system switch or configuration of system elements. Those skilled in the art will recognize that the disclosed techniques may be used in any communication application in which it is desirable to have a team of agents engage in training while servicing a contact or work item associated with the contact.

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

Figure 1:
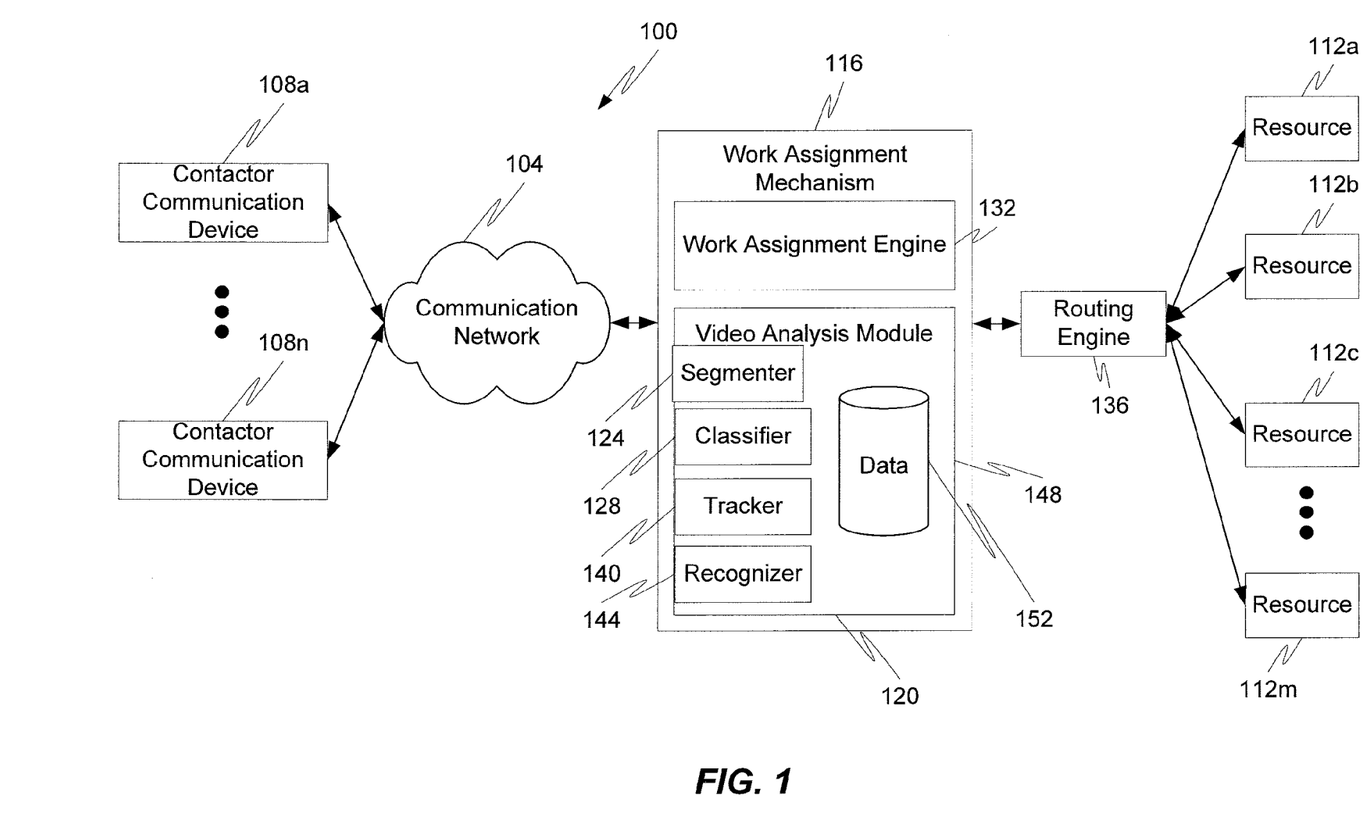
FIG. 1 is a block diagram depicting a communication system in accordance with an embodiment of the present disclosure.

FIG. 1 shows an illustrative embodiment of a communication system 100 in accordance with at least some embodiments of the present disclosure. The communication system 100 may be a distributed system and, in some embodiments, comprises a communication network 104 connecting one or more communication devices 108a-n to a work assignment mechanism 116, which may or may not be owned and operated by an enterprise administering a contact center (or predictive dialer or call center) in which a plurality of resources 112a-m are distributed to handle incoming work items (in the form of contacts) from the contactor (e.g., customer) communication devices 108a-n.

Exemplary contact centers for the present disclosure include not only customer-service contact centers but also Public Safety Access Point (or "PSAP") contact centers responsible for answering contacts to an emergency telephone number (e.g., 9-1-1) for police, firefighting, ambulance, and other emergency services. Trained telephone operators are also usually responsible for dispatching these emergency services. Most PSAPs are now capable of caller location for landline calls, and many can handle mobile phone locations as well (sometimes referred to as phase II location), where the mobile phone company has a handset location system (such as satellite positioning system). If a governmental entity operates its own PSAP, but not its own particular emergency service (for example, for a city-operated PSAP there is country fire but no city police), it may be necessary to relay the call to the PSAP that does handle that type of call.

In accordance with at least some embodiments of the present disclosure, the communication network 104 may comprise any type of known communication medium or collection of communication media and may use any type of protocols to transport messages between endpoints. The communication network 104 may include wired and/or wireless communication technologies. The Internet is an example of the communication network 104 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a cellular network, and any other type of packet-switched or circuit-switched network known in the art. In addition, it can be appreciated that the communication network 104 need not be limited to any one network type, and instead may be comprised of a number of different networks and/or network types. As one example, embodiments of the present disclosure may be utilized to increase the efficiency of a grid-based contact center. Examples of a grid-based contact center are more fully described in copending U.S. patent application Ser. No. 12/469,523 to Steiner, the entire contents of which are hereby incorporated herein by reference. Moreover, the communication network 104 may comprise a number of different communication media such as coaxial cable, copper cable/wire, fiber-optic cable, antennas for transmitting/receiving wireless messages, and combinations thereof.

The communication devices 108a-n may correspond to contactor communication devices. In accordance with at least some embodiments of the present disclosure, a contactor may utilize their communication device 108a-n to initiate a work item, which is generally a request for a processing resource 112a-m. Exemplary work items include, but are not limited to, a multimedia contact directed toward and received at a contact center, a web page request directed toward and received at a server farm (e.g., collection of servers), a media request, an application request (e.g., a request for application resources location on a remote application server, such as a SIP application server), and the like. The work item may be in the form of a message or collection of messages transmitted over the communication network 104. For example, the work item may be transmitted as a telephone call, a packet or collection of packets (e.g., IP packets transmitted over an IP network), an email message, an Instant Message, an SMS message, a fax, and combinations thereof. In some embodiments, the communication may not necessarily be directed at the work assignment mechanism 116, but rather may be on some other server in the communication network 104 where it is harvested by the work assignment mechanism 116, which generates a work item for the harvested communication. An example of such a harvested communication includes a social media communication that is harvested by the work assignment mechanism 116 from a social media network or server. Exemplary architectures for harvesting social media communications and generating work items based thereon are described in copending U.S. patent application Ser. Nos. 12/784,369, 12/706,942, and 12/707,277, filed Mar. 20, 1010, Feb. 17, 2010, and Feb. 17, 2010, respectively, each of which are hereby incorporated herein by reference in their entirety.

The format of the work item may depend upon the capabilities of the communication device 108a-n and the format of the communication. In particular, work items are logical representations within a contact center of work to be performed in connection with servicing a communication received at the contact center (and more specifically the work assignment mechanism 116). The communication may be received and maintained at the work assignment mechanism 116, a switch or server connected to the work assignment mechanism 116, or the like until a resource 112 is assigned to the work item representing that communication at which point the work assignment mechanism 116 passes the work item assignment decision to a routing engine 136 to connect the communication device 108 which initiated the communication with the assigned or selected resource 112a-m.

Although the routing engine 136 is depicted as being separate from the work assignment mechanism 116, the routing engine 136 may be incorporated into the work assignment mechanism 116 or its functionality may be executed by the work assignment engine 132.

In accordance with at least some embodiments of the present disclosure, the communication devices 108a-n may comprise any type of known communication equipment or collection of communication equipment. Examples of a suitable communication device 108a-n include, but are not limited to, a personal computer, laptop, Personal Digital Assistant (PDA), cellular phone, smart phone, telephone, or combinations thereof. In general each communication device 108a-n may be adapted to support video, audio, text, and/or data communications with other communication devices 108a-n as well as the processing resources 112a-m. In one application, the communication devices 108a-n are video telephony devices (e.g., videophones, telepresence devices, a camera-equipped cellular or wireless phone, a mobile collaboration device, and a personal, tablet, or laptop computer with a camera or web camera). The type of medium used by the communication device 108a-n to communicate with other communication devices 108a-n or processing resources 112a-m may depend upon the communication applications available on the communication device 108a-n.

In accordance with at least some embodiments of the present disclosure, the work item is sent toward a collection of processing resources 112a-m via the combined efforts of the work assignment mechanism 116 and routing engine 136. The resources 112a-m can either be completely automated resources (e.g., Interactive Voice Response (IVR) units, processors, servers, or the like), human resources utilizing communication devices (e.g., human agents utilizing a computer, telephone, laptop, etc.), or any other resource known to be used in contact centers.

As discussed above, the work assignment mechanism 116 and resources 112a-m may or may not be owned and operated by a common entity in a contact center format. In some embodiments, the work assignment mechanism 116 may be administered by multiple enterprises, each of which has their own dedicated resources 112a-m connected to the work assignment mechanism 116.

In some embodiments, the work assignment mechanism 116 comprises a work assignment engine 132 which enables the work assignment mechanism 116 to make intelligent routing decisions for work items. In some embodiments, the work assignment engine 132 is configured to administer and make work assignment decisions in a queueless contact center, as is described in copending U.S. patent application Ser. No. 12/882,950, the entire contents of which are hereby incorporated herein by reference.

More specifically, the work assignment engine 132 can determine which of the plurality of processing resources 112a-m is qualified, skilled, and/or eligible to receive the work item and further determine which of the plurality of processing resources 112a-m is best suited to handle the processing needs of the work item. In situations of work item surplus, the work assignment engine 132 can also make the opposite determination (i.e., determine optimal assignment of a work item resource to a resource). In some embodiments, the work assignment engine 132 is configured to achieve true one-to-one matching by utilizing bitmaps/tables and other data structures.

The work assignment engine 132 may reside in the work assignment mechanism 116 or in a number of different servers or processing devices. In some embodiments, cloud-based computing architectures can be employed whereby one or more components of the work assignment mechanism 116 are made available in a cloud or network such that they can be shared resources among a plurality of different users. In addition to comprising the work assignment engine 132, the work assignment mechanism 116 includes a video analysis module 148 that may also comprise a number of video analytics algorithms, namely a segmenter 124, a classifier 128, a tracker 140, and a recognizer 144, and a database 152 containing various types of contact center and video analytics information to analyze any work item comprising multimedia (i.e., video) information. The video analytics or video content analysis algorithms typically utilize a combination of computer vision, pattern analysis, and machine intelligence to detect, recognize or otherwise sense visual objects. Video analytics uses computer vision algorithms to enable it to perceive or see and machine intelligence to interpret, learn and draw inferences. Video analytics can understand a scene, which differs from motion detection. In addition to detecting motion, video analytics can qualify the motion as an object, understand the context around the object, and track the object through the scene. Commonly, video analytics detects changes occurring over successive frames of video, qualifies these changes in each frame, correlates qualified changes over multiple frames, and interprets these correlated changes.

Objects recognizable by video analytics can take many forms. Examples include bodily or body part movements, positions and relative orientations (e.g., gaze direction, bodily movements and gestures such as expressions or moods denoting anger, shock, surprise, panic or fear, and the like, mannerisms, styles, etc.), bodily poses, and the like), facial expressions, articles or items of clothing, attire, or covering, bodily condition (e.g., bleeding, prostrate, running, not moving, and the like), non-human objects in the foreground or background (such as cars, animals, lights and light colors (such as of an emergency vehicle), trees, snow, and the like), human objects in the foreground or background, and the like.

The segmenter 124, using one or more (periodically updated) background and foreground models retrieved from database 152, performs a segmentation operation that detects changes, measures the degree of change, localizes the change, and extracts relevant changes for further analysis and qualification. A goal of the segmenter 124 is to identify foreground blobs, a blob being a collection of connected pixels. Pixels that have changed are referred to as "Foreground Pixels"; those that do not change are called "Background Pixels". Segmentation is frequently called "Background Subtraction". Pixels remaining after the background has been subtracted are the foreground pixels. In one configuration, operations include background subtraction, clutter removal, morphological smoothing, blob labeling, and/or background updating. An example of a background model is to use a first frame as a background frame, and subtract a subsequent frame from the background frame to form a difference image. Thresholds can be used to convert the difference image to a foreground image, such that all pixels with differences greater than a predetermined threshold are foreground pixels. The degree of "change" which is used to identify foreground pixels is a factor in segmentation and can vary depending on the application. In another embodiment, the background model uses the mean image over N frames as the background image. The input to segmentation is a sequence of video frames, and the output is a set of labeled and unique foreground blobs for each frame.

The classifier 128, using one or more (periodically updated) appearance and/or shape models retrieved from database 152, qualifies each labeled blob, by assigning it a class label or category, to provide a classified object. This results in a broad categorization of each labeled blob into sufficiently distinct classes such as person, vehicle, animal, etc. Classification commonly differs from recognition because it does not provide identification of a specific instance, as in the case of face recognition or vehicle number plate recognition. Classification may be done on a single frame or may use information over multiple frames. Some combination of properties of features of each labeled blob is used to assign the class label. These features need to be selected in a manner such that they provide sufficient discrimination between each valid class. Binary classifiers are generally used to separate object blobs into one of two classes, e.g., a person or a non-person. Multi-class classifiers separate object blobs into one of many classes, e.g. a person, vehicle or animal. A classifier commonly provides only a prediction for an object belonging to a class or, alternatively, a likelihood of an object being in a certain class. A classifier may also provide the likelihood of an object not belonging to a given class. Image features can be used to discriminate a first class from a second class.

In some applications, classification may not be sufficient and the recognizer 144 may need to co-process video information with the classifier 128. Recognition is the process of identifying a specific instance, e.g. a license plate or the face of a specific individual. Recognition often requires pattern matching against defined sets of object characteristics potentially being recognized. "Prior knowledge" is typically embodied as one or more defined sets of pixel patterns describing characteristics of the corresponding object.

The tracker 128, using one or more (periodically updated) motion and/or camera models retrieved from database 152, tracks classified foreground objects over multiple frames as objects move through the field of view. Tracking establishes correspondence between classified objects over successive frames of video; that is, for each classified object in a starting frame, the position of that classified object in successive frames needs to be identified. A trajectory can then be calculated for the classified object by connecting its position over multiple frames. Various methods for tracking are based on motion coherence, appearance, and shape models.

Once foreground objects or blobs have been segmented, classified and tracked, the motion and behavior of the objects can be described in the context of a scene. The behavior of other objects in the scene relative to a given object can also be analyzed. The recognizer 144 performs activity recognition as the final step that combines the results of classification and tracking, correlating the tracks of multiple classified and tracked objects to infer the activity occurring in the video. Part-based analysis may be conducted to understand activities undergone by a human in which the head, torso, arms and legs are each tracked, and his or her trajectories are analyzed. Such analysis can provide information on activities such as jumping, crouching, reaching and bending. Finally, gesture recognition techniques can report on the detailed movements of the hands and fingers and can be used to qualify activities such as grasping and gesturing (e.g., pointing and waving). For instance, if two blobs corresponding to people progressively come closer, this could be interpreted as converging people. If two blobs, one corresponding to a vehicle and another corresponding to a person happen to merge, this could be interpreted as a person getting into a vehicle.

The output of the video analytics algorithms is an activity report containing sensed information, which may be used for various purposes, including, but not limited to, selecting an appropriate skilled resource to service the contact and/or providing information to the selected resource to service better the contactor.

The work assignment engine 132 uses the activity report to select an appropriate resource or set of resources 112*a*-*m* to service the contact and filters the activity report to send service information to the selected resource 112*a*-*m*.

As will be appreciated, the video analytics algorithms may not employ all these functions, or may not apply the functions strictly in the order specified, or may use one or more different functions. Multiple trackers or classifiers may run in parallel.

It should be noted that the video analysis module 148 does not necessarily need to reside in the work assignment mechanism 116. Rather, the video analysis module 148, or portions thereof, may be implemented in the routing engine 136 or some other separate server or switch that is connected to the work assignment mechanism 116. It may also be possible to implement multiple video analysis modules 148 at different locations in the contact center.

A number of examples will be discussed to illustrate the operation of the communication system 100.

In a first example, a video stream is received from a customer in a contact center. The video stream includes information including a customer attire, associated style, customer mannerism(s), mood(s) as denoted by body expression, position, and movements, and the like. From this information, the work assignment engine 132 can ascertain a category, a socioeconomic class, actual or prospective customer class or category (e.g., gold, silver or bronze), community, or geographical region to which the customer belongs and/or in which the customer resides. The customer, for instance, may be dressed with attire that is typically associated with a younger age group, a professional community, and/or an ethnic group. Other factors, such as the attire branding are relevant, presence of accessories like jewelry and even personal items, such as a tattoo. Video analysis of the other objects in the video stream can further be used to identify a prospective customer need or purpose of the contact and therefore to identify a recommended resource or set of resources to service the contact. For example, a call to an automotive parts or warranty service could use a background image of a car to identify the make (or manufacture), year, and model (or brand) of car owned by the contactor.

The outputs from the video analysis module 148 can be used to make real-time contact routing decisions. Initially, based on the customer attire (type of clothing, clothes branding, if identified, use of jewelry, hairstyle, eyeglasses, tattoos, and the like) the customer will be matched with a subset of human agent resources 112*a*-*m* that are more suitable to handle the contact. The multimedia contact is then routed, by the routing engine 136, to an appropriate skill set within that subset of agents. By way of further illustration, if the customer were to be dressed casually, an agent with similar attire could be matched with the customer. On the other hand, a more formally dressed customer could be routed to an agent that is also formally dressed. In this manner, the return video channel will provide an image of the selected agent that is more comforting to the customer. In a contact center that is focused on sales opportunities, expensive branded clothing can be used as an indicator as to the potential sale or upsell opportunity, analogous to a situation in a real store where a sales attendant can make a judgment on the potential value of a customer based on his or her presentation. Because the agent video stream is visible to the customer, it can be relevant to have a strategy in place within the contact center as to how agents are presented (e.g., formal, casual dress, and the like).

In a second example, a PSAP contact center receives an emergency video call from a contactor. The video stream includes information including a contactor facial expression and bodily movements and other human and non-human objects in the scene and how they are interacting with the contactor and one another. For example, the contactor could be standing in front of or behind a vehicular accident, fire, bloodied assault victim, broken window from a robbery, weapon-bearing person, and the like. The information can be captured by the video analysis module 148 and be used to select an emergency responder (e.g., firetruck, police car, animal control, ambulance, flight-for-life, etc.) to dispatch to the emergency. Alternatively or additionally, the information could be used to provide advice to the contactor, such as medical advice for the contactor or an injured person being ministered to by the contactor. Alternatively or additionally, the information could be used to set an urgent flag to the emergency responder indicating a level of urgency of the response. A three-alarm fire would receive a higher level of urgency than a one-alarm fire, and a fatality would receive a lower level of urgency than a seriously injured person requiring immediate medical attention. The requirement for additional emergency vehicles, such as more fire trucks, could be ascertained by the work assignment mechanism 116 and appropriate requests automatically sent to the appropriate PSAP or emergency responder. Alternatively or additionally, the information could be used, with any satellite positioning information received from the contactor communication device 108*a*-*n* to locate more precisely the location of the emergency. Background or foregound features, such as a uniquely designed public, charitable, or private building could, for example, indicate to the video analysis module 148, the precise location of the accident. The resource 112*a*-*m* could receive a message or pop-up on his or her display providing video analysis results. Alternatively or additionally, the video analysis results (or a call-by-call comparison of the video analysis results) could be used to identify calls or callers respecting the same emergency for assigning a lower priority to the calls or providing an automated message indicated that the emergency was currently being handled.

As will be appreciated, the video analysis module 148 may collect other types of medically relevant information about a person (whether the contactor or another) captured in the video stream even in the absence of physical injury or illness. Examples of medical indicators, including those unrelated to facial expressions or gestures, include inappropriate perspiration (e.g., heavy sweating on a cold day or lack of sweating after physical activity on a hot day (e.g., possible heat stroke)), unusual skin tone (e.g., pale, flushed, or jaundiced), unusual breathing pattern (e.g., rapid or shallow breathing), trembling, asymmetry (e.g., one side of the face or body versus the other), sobrietary (e.g., symptoms of alcohol or drug influence), and the like.

Figure 2:
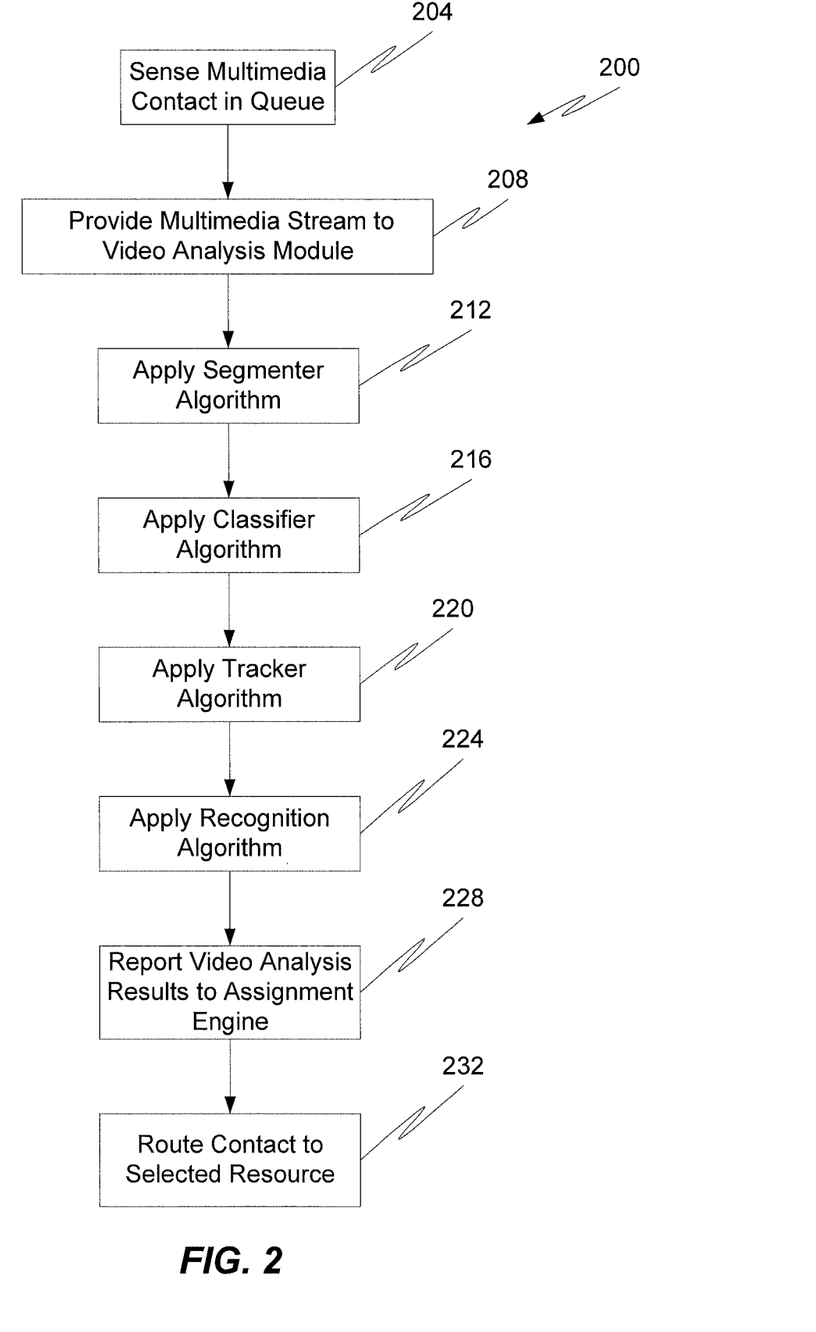
FIG. 2 is a flow chart depicting a first operational embodiment of the contact center in accordance with one embodiment of the present disclosure.

Referring now to FIG. 2, a method 200 of applying the work assignment mechanism 116 will be discussed in accordance with embodiments of the present disclosure. The method begins at step 204 when a multimedia contact is received, typically in queue, and the video capability of the contact sensed. It should be noted that receiving a contact in queue may be a simulated, real-time, and/or near-real-time event and may be at least one of a fictitious, real, and/or recording of an actual contact. Moreover, the contact may be received in the queue by a number of different methods, including, but in no way limited to, assignment by the work assignment engine 132, routing engine 136, manual placement, computer testing and/or development, and/or any combination thereof.

The method continues at step 208, where the multimedia (video) stream of the enqueued contact is provided to the video analysis module 116.

At step 212, the segmenter 124 algorithm is applied to the multimedia (video) stream. The segmenter 124, using one or more (periodically updated) background and foreground models retrieved from database 152, performs a segmentation operation that detects changes, measures the degree of change, localizes the change, and extracts relevant changes for further analysis and qualification. The input to segmentation is a sequence of video frames, and the output is a set of labeled and unique foreground blobs for each frame.

At step 216, the classifier 128 algorithm is applied to the output of the segmenter 124 algorithm. The classifier 128, using one or more (periodically updated) appearance and/or shape models retrieved from database 152, qualifies each labeled blob, by assigning it a class label or category, to provide a classified object. Binary classifiers are generally used to separate object blobs into one of two classes, e.g. a person or a non-person, while multi-class classifiers separate object blobs into one of many classes, e.g. a person, vehicle or animal. A classifier commonly provides only a prediction for an object belonging to a class or, alternatively, a likelihood of an object being in a certain class. A classifier may also provide the likelihood of an object not belonging to a given class. The output of the classifier 128 algorithm is a set of class labeled or categorized blobs and optionally a likelihood that the object is in the assigned class.

At step 220, the tracker 140 algorithm is applied to the set of labeled and unique foreground blobs for each frame. The tracker 140 algorithm, using one or more (periodically updated) motion and/or camera models retrieved from database 152, tracks classified foreground objects over multiple frames as objects move through the field of view.

At step 224, the recognizer 144 algorithm is applied to the labeled or categorized blobs. The recognizer 144 analyzes the behavior of other objects in the scene relative to a given object. The activity recognition in step 224 combines the results of classification and tracking, correlating the tracks of multiple classified and tracked objects to infer the activity occurring in the video. Gesture recognition techniques can report on the detailed movements of the hands and fingers and can be used to qualify activities such as grasping, pointing and waving.

In step 228, the activity report outputted by the video analytics algorithms is provided to the work assignment engine 132 for resource selection and/or assignment.

In step 232, the contact is routed, by the routing engine 136, to the selected resource 112a-m for servicing.

Figure 3:
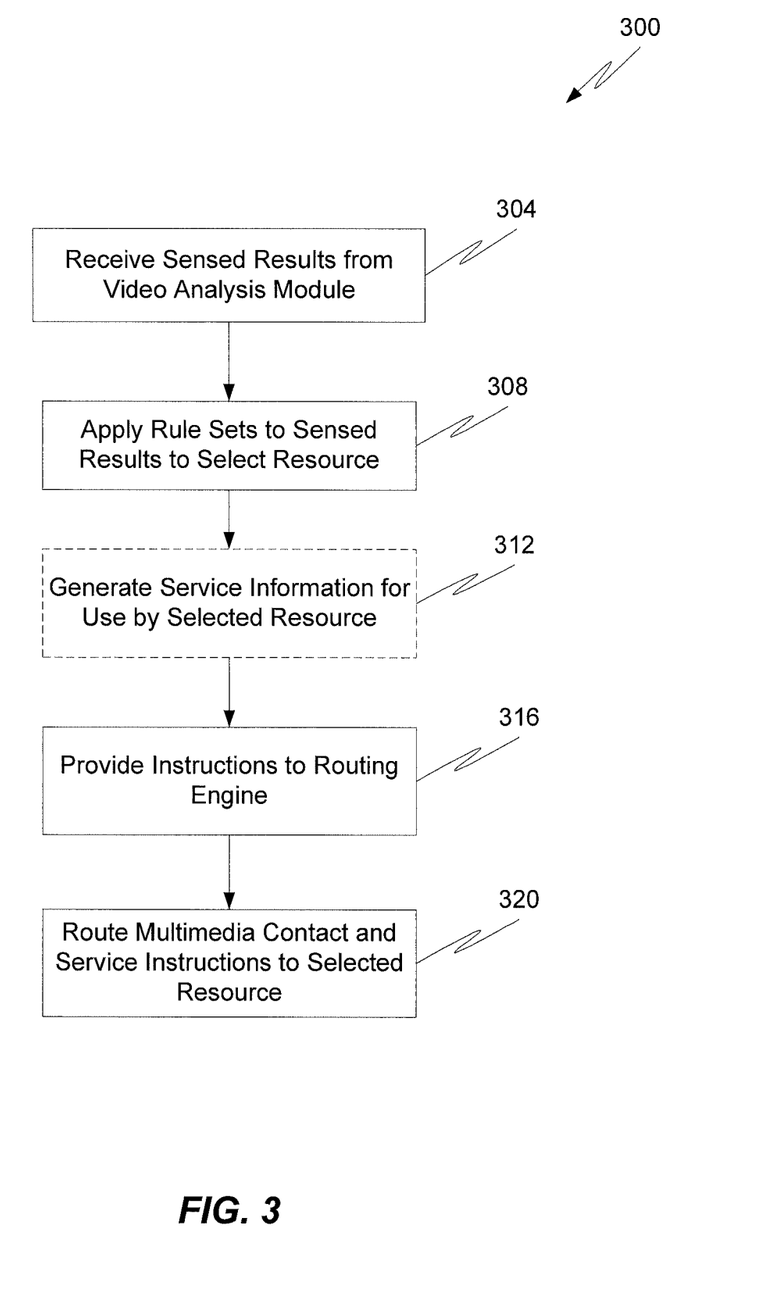
FIG. 3 is a flow chart depicting a second operational embodiment of the contact center in accordance with one embodiment of the present disclosure.

FIG. 3 shows a method of operation of the work assignment engine 132 according to an embodiment of step 228.

In step 304, the work assignment engine 132 receives, from the video analysis module, the activity report comprising video analysis results.

In step 308, the work assignment engine 132 applies rule sets to the video analysis results to select an appropriate resource 112a-m to service the contact. Resource selection can be based on multiple factors, including not only agent skills and capabilities and contactor needs but also the sensed information in the activity report, as noted above. The sensed information can be compared against characteristics of each of the human agent resources 112a-m, which characteristics may themselves be determined by the video analysis module 148 through analysis of the video stream of each of the agent resources, to select an appropriate resource 112a-m to service the contact.

Figure 4:
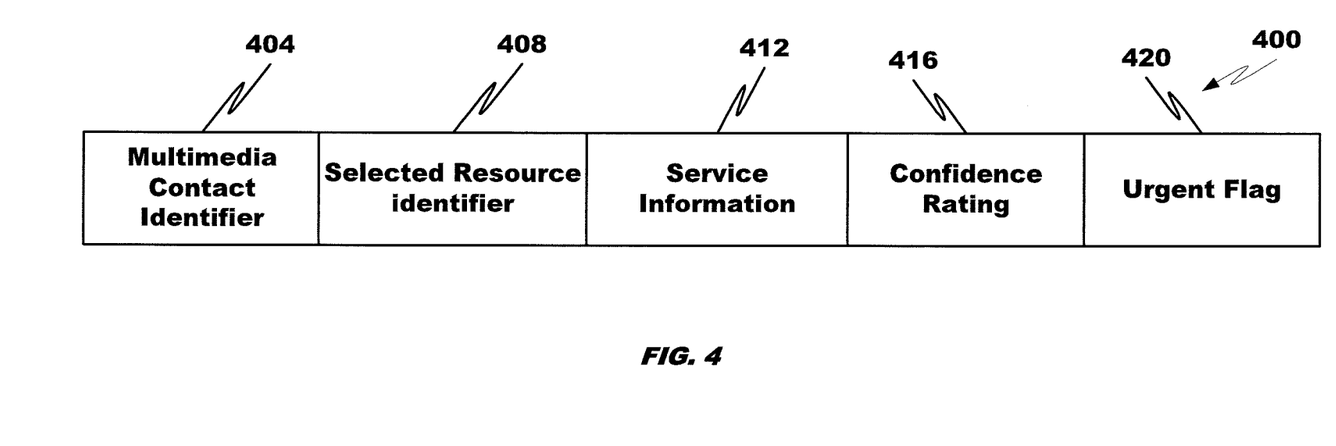
FIG. 4 is a block diagram depicting a data structure used in accordance with embodiments of the present disclosure.

In optional step 312, the work assignment engine 132 generates, from the video analysis results, service information for use by the selected resource 112a-m. With reference to FIG. 4, a data structure and/or packet comprising the service information is illustrated according to an embodiment. The data structure and/or packet 400 includes a multimedia contact identifier 404, which may be a source address, a combination of the source and destination addresses, or a code generated by the communication system 100, a selected resource identifier 408, which may be a destination address, a combination of the source and destination addresses, or a code generated by the communication system 100, service information 412 (which includes the, typically filtered, results from one or more of the components of the video analysis module and other information noted above), confidence rating 416 (which indicates a level of confidence or likelihood that the video analysis results accurately describe a selected object or objects in the scene described by the video stream), and an urgent flag 420 (indicating a level of urgency of servicing the work item associated with the contact).

In step 316, the work assignment module 136 provides instructions to the routing engine 136, to route the contact to a selected resource 112a-m.

In step 320, the routing engine 136 routes the contact to the selected resource 112a-m.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor (GPU or CPU) or logic circuits programmed with the instructions to perform the methods (FPGA). These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A method comprising:
    segmenting, by a processor executing a video analysis module, a video stream to produce segmented video analysis results, the segmenting using background and foreground models retrieved from one or more databases and comprising detecting a change, measuring a degree of the change, localizing the change, and extracting relevant changes;
    classifying, by the processor executing the video analysis module, the segmented video analysis results using one or more appearance models retrieved from one or more databases to generate classified video analysis results;
    tracking, by the processor executing the video analysis module, the classified video analysis results using one or more motion and camera models retrieved from one or more databases to generate tracked video analysis results;
    recognizing, by the processor executing the video analysis module, at least one object present in the video stream to generate an activity report, the recognizing comprising combining the classified video analysis results and the tracked video analysis results; and
    selecting, by the processor executing a work assignment engine and based on the activity report, a communication device of a resource from among a plurality of communication devices of a plurality of resources to initially service a contact of a contact center.

2. The method of claim 1, wherein a source of the video stream is the selected communication device and wherein the video stream comprises an image of the resource.

3. The method of claim 2, wherein the recognizing at least one object present in the video stream further comprises analyzing the at least one object to automatically determine at least one sales opportunity; and
    comparing at least a portion of the activity report with video analysis results from analysis of a second video stream comprising an image of a contactor associated with the contact.

4. The method of claim 1, wherein a source of the video stream is a communication device of a contactor associated with the contact, the video stream comprises an image of the contactor, and the activity report comprises an identification instance of one or more of the following: a bodily movement of the contactor, a bodily position of the contactor, a bodily orientation of the contactor, an item or article of clothing of the contactor, a gesture of the contactor, a mannerism of the contactor, a medical condition of the contactor, and a non-human object in a scene provided by the video stream.

5. The method of claim 4, wherein the activity report comprises a prediction of one or more of the following: a potential sale or upsell opportunity, an identity of the contactor, a socioeconomic class of the contactor, a customer class of the contactor, a geographical location of the contactor, an age of the contactor, a profession of the contactor, a need of the contactor, a manufacture, brand or model of an item associated with the contactor, and a purpose of the contact.

6. The method of claim 4, wherein the resource is an emergency responder and the contact center is a Public Safety Access Point contact center.

7. The method of claim 6, wherein the activity report is used for one or more of: providing advice to the emergency responder, selecting a type of emergency responder to be dispatched, determining a geographic location of the contactor, determining an urgency in dispatching an emergency responder, and identifying contacts associated with a common emergency event.

8. A work assignment system comprising:
    a processor; and
    a computer readable medium coupled to the processor and comprising instructions that, when executed by the processor, cause the processor to:
        segment a video stream to produce segmented video analysis results, the segmenting using background and foreground models retrieved from one or more databases and comprising detecting a change, measuring a degree of the change, localizing the change, and extracting relevant changes;
        classify the segmented video analysis results using one or more appearance models retrieved from one or more databases to generate classified video analysis results;

track the classified video analysis results using one or more motion and camera models retrieved from one or more databases to generate tracked video analysis results;

recognize at least one object present in the video stream to generate an activity report, the recognizing comprising combining the classified video analysis results and the tracked video analysis results; and select, based on the activity report, a communication device of a resource from among a plurality of communication devices of a plurality of resources to initially service a contact of a contact center.

9. The work assignment system of claim 8, wherein a source of the video stream is the selected communication device and wherein the video stream comprises an image of the resource.

10. The work assignment system of claim 9, wherein the instructions, when executed by the processor, further cause the processor to:

compare at least a portion of the activity report with video analysis results from analysis of a second video stream comprising an image of a contactor associated with the contact.

11. The work assignment system of claim 8, wherein a source of the video stream is a contactor associated with the contact, the video stream comprises an image of the contactor, and the activity report comprises an identification instance of one or more of the following: a bodily movement of the contactor, a bodily position of the contactor, a bodily orientation of the contactor, an item or article of clothing of the contactor, a gesture of the contactor, a mannerism of the contactor, a medical condition of the contactor, and a non-human object in a scene provided by the video stream.

12. The work assignment system of claim 11, wherein recognizing further comprises analyzing the at least one object to automatically determine at least one sales opportunity, and the activity report comprises a prediction of one or more of the following: a potential sale or upsell opportunity, an identity of the contactor, a socioeconomic class of the contactor, a customer class of the contactor, a geographical location of the contactor, an age of the contactor, a profession of the contactor, a need of the contactor, a manufacture, brand or model of an item associated with the contactor, and a purpose of the contact.

13. The work assignment system of claim 8, wherein the resource is an emergency responder, the contact center is a Public Safety Access Point contact center, and the activity report comprises one or more of: advice for the emergency responder, identification of a type of emergency responder to be dispatched, information corresponding to a geographic location of the contactor, information corresponding to an urgency in dispatching an emergency responder, and identification of contacts associated with a common emergency event.

14. A contact center, comprising:
a processor; and
a computer readable medium, coupled to the processor, comprising instructions that program the processor to:
segment a video stream using background and foreground models retrieved from one or more databases to produce segmented video analysis results, wherein the processor detects a change, measures a degree of the change, localizes the change, and extracts relevant changes;

classify the segmented video analysis results using one or more appearance models retrieved from one or more databases to produce classified video analysis results, track the classified video analysis results using one or more motion and camera models retrieved from one or more databases to produce tracked video analysis results, recognize at least one object present in the video stream to produce an activity report, the recognizing comprising combining the classified video analysis results and the tracked video analysis results; and select, based on the segmented video analysis results, a communication device of a resource from among a plurality of communication devices of a plurality of resources to initially service a contact of the contact center.

15. The contact center of claim 14, wherein a source of the video stream is the selected communication device of the resource and wherein the video stream comprises an image of the resource.

16. The contact center of claim 15, wherein the recognizing further comprises analyzing the at least one object to automatically determine at least one sales opportunity and the instructions further program the processor to:

compare at least a portion of the activity report with video analysis results from analysis of a second video stream comprising an image of a contactor associated with the contact.

17. The contact center of claim 14, wherein a source of the video stream is a communication device of a contactor associated with the contact, the video stream comprises an image of the contactor, and the activity report comprises an identification instance of one or more of the following: a bodily movement of the contactor, a bodily position of the contactor, a bodily orientation of the contactor, an item or article of clothing of the contactor, a gesture of the contactor, a mannerism of the contactor, a medical condition of the contactor, and a non-human object in a scene provided by the video stream.

18. The contact center of claim 17, wherein the activity report comprises a prediction of one or more of the following: a potential sale or upsell opportunity, an identity of the contactor, a socioeconomic class of the contactor, a customer class of the contactor, a geographical location of the contactor, an age of the contactor, a profession of the contactor, a need of the contactor, a manufacture, brand or model of an item associated with the contactor, and a purpose of the contact.

19. The contact center of claim 14, wherein the resource is an emergency responder and the contact center is a Public Safety Access Point contact center.

20. The contact center of claim 19, wherein the activity report is used for one or more of: providing advice to the emergency responder, selecting a type of emergency responder to be dispatched, determining a geographic location of the contactor, determining an urgency in dispatching an emergency responder, and identifying contacts associated with a common emergency event.

* * * * *